W. F. OTTMANN.
FISH AND CRAB TRAP.
APPLICATION FILED OCT. 9, 1915.
1,193,816.
Patented Aug. 8, 1916.
3 SHEETS—SHEET 1.
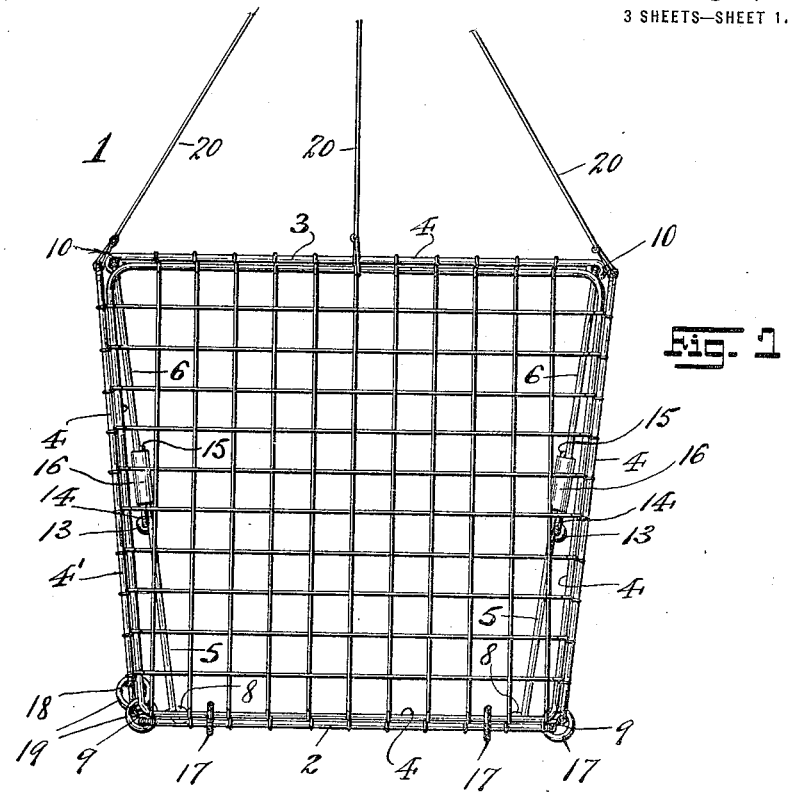
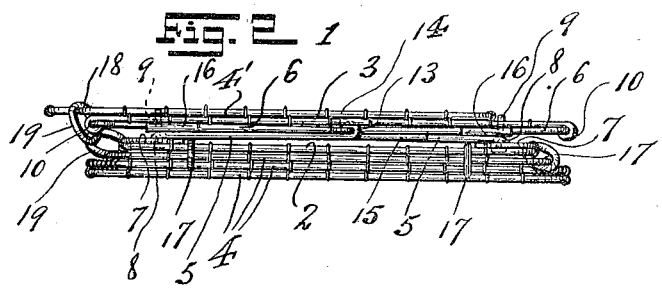
WITNESSES:
Fredk. H. W. Frantzel.
Eva E. Desch.
INVENTOR
William F. Ottmann,
BY
Frantzel and Richards,
ATTORNEYS

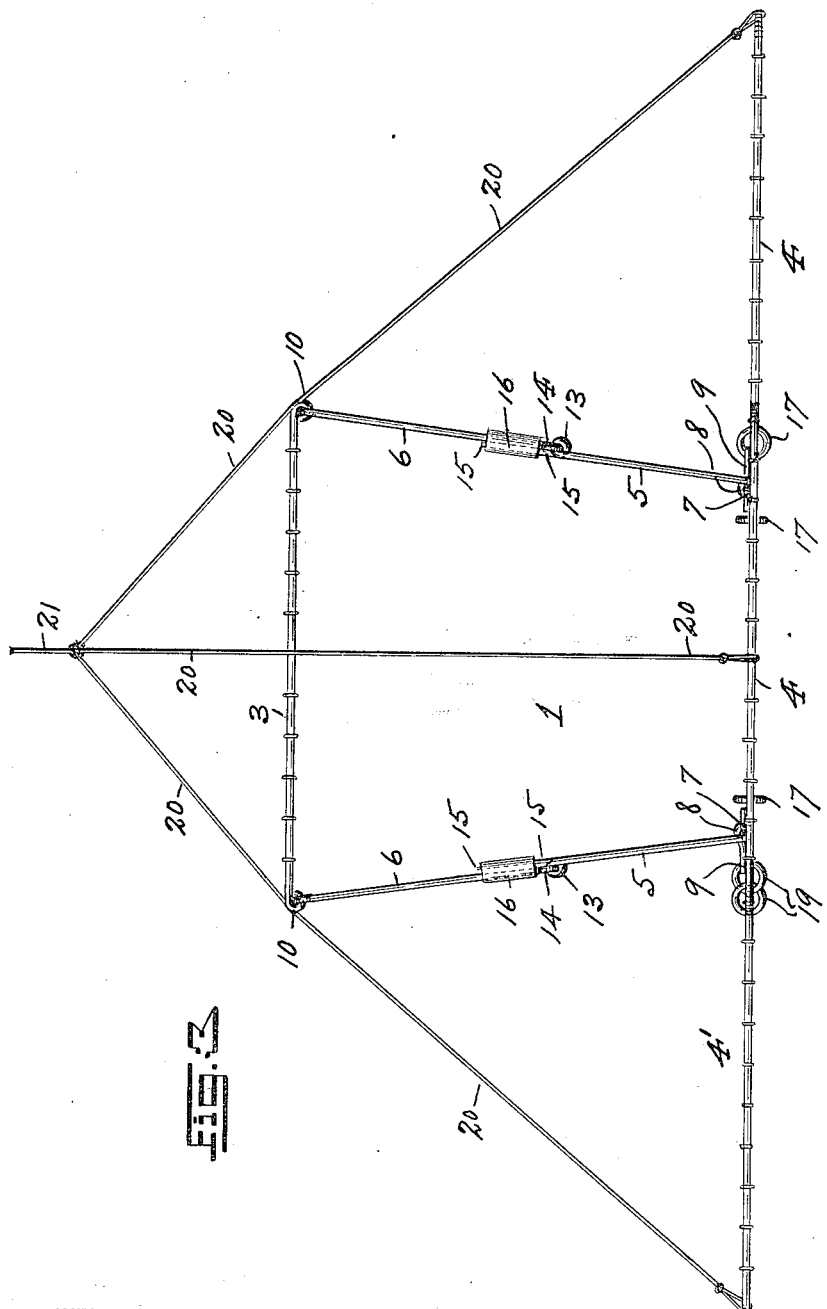

W. F. OTTMANN.
FISH AND CRAB TRAP.
APPLICATION FILED OCT. 9, 1915.
1,193,816.
Patented Aug. 8, 1916.
3 SHEETS—SHEET 3.
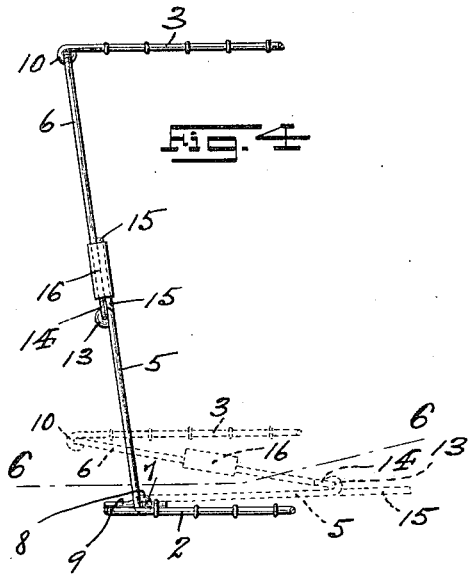
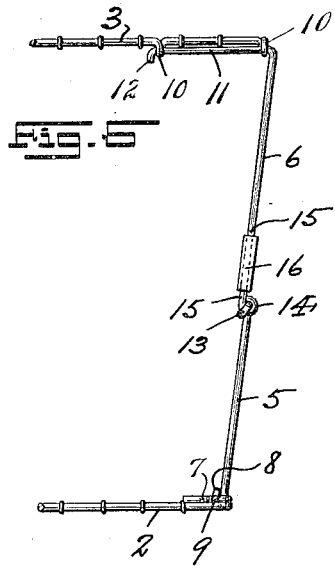
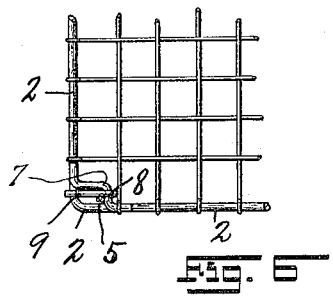
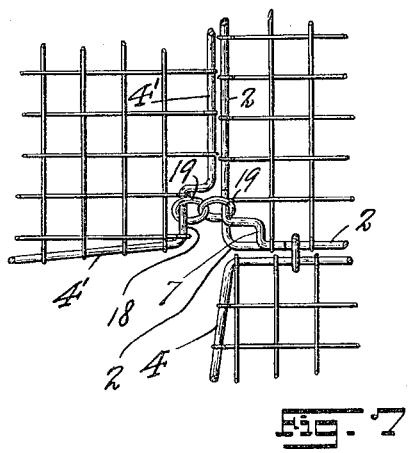
WITNESSES:
Fredk H. W. Frantzel
Eva E. Desch
INVENTOR
William F. Ottmann,
BY
Frantzel and Richards
ATTORNEYS

UNITED STATES PATENT OFFICE.

WILLIAM F. OTTMANN, OF NEW YORK, N. Y., ASSIGNOR TO ABBEY & IMBRIE, A CORPORATION OF NEW YORK.

FISH AND CRAB TRAP.

1,193,816.      Specification of Letters Patent.      Patented Aug. 8, 1916.

Application filed October 9, 1915. Serial No. 54,930.

*To all whom it may concern:*

Be it known that I, WILLIAM F. OTTMANN, a citizen of the United States, residing at 2431 First avenue, New York, in the county of New York and State of New York, have invented certain new and useful Improvements in Fish and Crab Traps; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to improvements in fish and crab traps of the type comprising a top section, a bottom section and four side sections, each of which has a hinged connection with the bottom section; and the invention has reference, more particularly, to a novel unitary construction of collapsible trap of the character above mentioned.

Heretofore traps of the character mentioned have been collapsible, to reduce the same to easily portable form, only by taking the same apart so that the top section and certain of the stays or supports were separated from the main portions of the trap, and thus the trap was of a "knock-down" type, rather than of a single unitary collapsible or foldable type. Such a construction has been found very unsatisfactory, in that the separated parts of the trap were liable to be mislaid, lost, dropped overboard from fishing boats, etc., and consequently the utility of the trap was absolutely destroyed by such loss of parts, until new parts could be secured to replace the same.

It is therefore, the principal object of my present invention to provide a novel construction of fish and crab trap of the type herein referred to, which is unitary and foldable; that is, a construction in which all the parts of the trap are permanently connected together, but are subject to be collapsed or folded together in flat compact form when the trap is not in use, so that the same is easily portable. Hence, my novel construction of collapsible or foldable trap eliminates, by the character of its construction, all danger of separation or loss of any of its parts, and provides at all times a construction of trap in which the parts are permanently related to each other, and easily manipulated to either set up or fold up the same as desired by the user.

Other objects of the present invention, not at this time more particularly enumerated will be clearly understood from the following detailed description of the same.

With the various objects of the present invention in view, the same consists, primarily, in the novel unitary construction of foldable fish and crab trap hereinafter set forth; and, the invention consists, furthermore, in the novel arrangements and combinations of the various devices and parts, as well as in the details of the construction of the said parts, all of which will be more fully described in the following specification, and then finally embodied in the claims which are appended to and which form an essential part of the said specification.

The invention is clearly illustrated in the accompanying drawings, in which:—

Figure 1 is a side elevation of the novel fish and crab trap made according to and embodying the principles of my present invention, the same being shown in set-up or operative condition and closed. Fig. 2 is a side elevation of said novel fish and crab trap, showing the same in collapsed or folded into its compact portable condition. Fig. 3 is another side elevation of said novel fish and crab trap, showing the same in set-up or operative condition and open ready for the trapping operation. Fig. 4 is a detail side elevation of a portion of the top and bottom sections of the trap, illustrating one of the novel articulated collapsible supporting stays with which the said parts are provided, and by means of which the same are permanently connected together; said view also showing, in dotted representation, the folded or collapsed position of said supporting stay. Fig. 5 is another detail side elevation of a portion of the top and bottom sections of the trap, illustrating one of said novel articulated collapsible supporting stays viewed from a different angle. Fig. 6 is a detail horizontal section taken on line 6—6 in said Fig. 4, looking downward. Fig. 7 is a fragmentary plan view of one corner of the bottom section of the trap showing two of the side sections in connection therewith, and illustrating a novel hinge connection of one of said side sections with said bottom section, adapted for purposes more clearly defined in the following specification.

Similar characters of reference are employed in all of the hereinabove described views, to indicate corresponding parts.

Referring now to the said drawings, the reference character 1 indicates the complete novel construction of fish and crab trap, made according to and embodying the principles of my present invention, the same comprising a bottom section 2, a top section 3, and side sections 4 and 4'; the said side sections corresponding in number to the number of straight edges provided by the peripheral shape of said bottom section 2. Each section, above enumerated, consists of a peripheral frame, preferably made of heavy wire, and a mesh supported thereon, preferably formed of interwoven light wire strands secured at their ends to said frames, or said mesh may be constructed in any other manner and of any other desirable material. The said top and bottom sections are permanently secured or interconnected together by means of a plurality of collapsible articulated uprights or supporting stays, constructed and associated with said top and bottom sections so as to extend between the corners of the same, as will now be described.

The reference character 5 indicates the lower member of an articulated upright or supporting stay, and 6 indicates the upper member of the same. Secured at each of the corner portions of the frame of the bottom section 2, by means of solder or otherwise, is a bearing piece 7, which provides an indented portion of angular form, upon one arm of which the lower end of said lower member 5 of the upright or stay is bent around to form a ring-like hinge-connection 8 journaled or pivoted thereon. The free end of said lower member 5 is bent at right angles to the upward extension of the main body thereof, that is horizontally, to form a stop portion 9 which engages the corner portion of the frame of said bottom section 2 included within the angle of said bearing piece 7, and this acts as a stop to limit the upward swinging movement of the lower member 5 in an outward direction when the same is erected. The frame of the top section 3 is bent at suitable points, at and adjacent to each corner thereof, to form pairs of spaced ringlike bearing portions 10. The upper end of each upper member 6 of the uprights or stays is bent at right-angles thereto to provide a journal arm 11, adapted to be received and pivotally supported within said bearing portions 10. The extremity of said journal arm 11 is bent over at right angles thereto to form a stop or retaining portion 12, adapted to prevent the withdrawal or accidental displacement of said journal arm 11 from said pivoted relation to said bearing portions 10. The meeting ends of said lower and upper members 5 and 6 of the uprights or stays are pivotally interconnected together by their respective ring like interjoined joint-members 13 and 14, whereby each upright or stay is articulated so as to collapse or fold together under proper conditions. Each lower member 5 is provided with an upwardly extending arm 15, which projects beyond the joint-member 13 thereof, and which, when the members of said stay or upright are arranged in erect and operative position relative to said top section 3 and bottom section 2 and to each other, parallels and alines itself with the corresponding upper member 6. Slidably arranged upon each upper member 6 is a tubular coupling member 16, which is adapted to be moved downwardly over said arm 15 to embrace the same, and couple or bind the same rigidly to said upper member, thereby alining said respective lower and upper members 5 and 6 together in rigid erect and supporting positions relative to the top and bottom sections 3 and 2, and thereby retaining the same against collapse or folding at their articulation or joint, thus rigidly maintaining said top-section 3 spaced above said bottom section 2 in operative position, as shown in Figs. 1, 3, 4 and 5 of the drawings.

The side sections 4 are each secured at one of their edges to the bottom section 2 by means of suitable hinge-like connections, such as is provided by the interconnecting rings 17. The side section 4' is also secured to the bottom section 2 by means of a slightly different hinge or pivotal connection; in the case of the side section 4' the frame thereof at each lower corner is bent inwardly or indented to provide a journal portion 18 spaced away from the periphery of said bottom section 2, and two or more interconnected ring-hinge elements 19 pivotally connect said journal portions 18 with said bottom section 2, so as to allow a greater latitude of separation between the bottom section 2 and the side-section 4' when the latter is folded over, thereby allowing the latter to be folded upwardly and over the top section 3, when the latter is collapsed or folded down upon the bottom section 2, as shown in Fig. 2 of the drawings. The remaining side sections 4 are adapted to fold beneath and upon the underside of said bottom section and over one another in any order desired, as is also shown in Fig. 2 of the drawings.

The reference character 20 indicates the cords or other flexible connections which are provided for and connected with each side section 4 and 4', and by means of which the said side sections may be swung upwardly to close the trap. All the cords 20 are preferably joined together and connected with a hauling and operating line 21, in order that all the side sections may be operated simultaneously and the closed trap hauled to the surface of the water.

In the operation of the trap, a bait is fastened to the middle of the bottom section 2. The trap is then lowered into the water, and when bottom is reached, and the line 21 slackened, the side sections 4 and 4' fall into open position, as shown in Fig. 3 of the drawings, so that the fish, crabs or other game has easy and unobstructed access to the bait. The side sections 4 and 4' are so formed that when they are unrestrained they tend to fall open under the influence of the force of gravity, and to assist this action the top section 3 is preferably made slightly larger in dimensions than the bottom-section 2, so as to permit the side sections to flare outwardly from the bottom section to which they are pivoted, and thus cause the same to lean out of the perpendicular so as to be more easily and quickly influenced by the force of gravity. When it is desired to fold or collapse the trap into easily and conveniently carried size or bulk, the side sections are allowed to drop down or open, then the tubular coupling devices 16 are slid upwardly to disengage the same from binding or holding relation to the arms 15 of the lower members 5 of the articulated uprights or stays, thus permitting said uprights or stays to collapse or yield at their articulations or joints so that the members thereof fold together in substantially horizontal positions. This collapse of said uprights or stays results in a lowering down of the top section 3 upon the bottom section 2, as indicated by the dotted lines in Fig. 4 of the drawings. When said top section 3 and bottom section 2 have been brought together in compact relation, said side sections 4 may be folded one upon another beneath the bottom section 2, and the side section 4' may be folded up over the lowered top section 3, and the trap is then completely collapsed and its bulk reduced to the compact size, as illustrated in Fig. 2 of the drawings. Of course, I do not limit myself to folding said side section 4' over the top section 3, since that is merely a preferable manner of operation and positions the same so as to hold the top section 3 in its collapsed position, but if it is desired to do so the construction of the hinge connections of said side sections 4' easily permits of its being folded beneath the bottom section 2, and over the previously folded remaining side sections 4.

It will be apparent from the above description that the novel construction thereof affords an easily operated foldable or collapsible trap of the kind specified, in which all the parts and sections thereof are permanently related together in both their erected and collapsed arrangement, so that the same cannot be separated one from another, whereby danger of loss of necessary parts of the trap would be the result of such separation. The important novel feature of my present combination, therefore, consists in the provision of the novel articulated collapsible and permanently connected uprights or stays between the top section 3 and bottom section 2 of the trap, which arrangement avoids any necessity of separating said top and bottom sections or at any time disconnecting the same from their interconnected relation as provided by said stays or uprights.

I am aware that some changes may be made in the general arrangements and combinations of the several devices and parts, as well as in the details of the construction of the same, without departing from the scope of the present invention as set forth in the foregoing specification, and as defined in the claims appended thereto. Hence, I do not limit my invention to the exact arrangements and combinations of the various devices and parts as herein set forth, and as illustrated in the accompanying drawings, nor do I confine myself to the exact details of the construction of said parts.

I claim:—

1. In a device of the kind described, a bottom section, a top section, a plurality of articulated collapsible uprights between said bottom section and top section adapted to permanently interconnect the same; each upright comprising a lower member pivoted to said bottom section, an upper member pivoted to said top section, an articulation or joint interconnecting said lower member with said upper member, releasable means for retaining said articulation or joint against operation; and side sections, each side section being connected pivotally to said bottom section.

2. In a device of the kind described, a bottom section, a top section, a plurality of articulated collapsible uprights between said bottom section and top section adapted to permanently interconnect the same; each upright comprising a lower member pivoted to said bottom section, an upper member pivoted to said top section, an articulation or joint interconnecting said lower member with said upper member, said lower member having an extension beyond its jointure with said upper member, said extension being adapted to aline itself parallel to said upper member when said uprights are erected in normal supporting position, a tubular coupling member slidable on said upper member and adapted to be moved over said extension to rigidly bind the same to said upper member and thus prevent the operation of said articulation or joint; and side sections, each side section being connected pivotally to said bottom section.

3. In a device of the kind described, a bottom section, a top section, a plurality of articulated collapsible uprights between said bottom section and top section adapted to permanently interconnect the same; each upright comprising a lower member pivoted to said bottom section, an upper member pivoted to said top section, an articulation or joint interconnecting said lower member with said upper member, said lower member having an extension beyond its jointure with said upper member, said extension being adapted to aline itself parallel to said upper member when said uprights are erected in normal supporting position, a tubular coupling member slidable on said upper member and adapted to be moved over said extension to rigidly bind the same to said upper member and thus prevent the operation of said articulation or joint; side sections, each side section having a hinge connected with the bottom section, and one of said side sections having journal portions spaced away from the periphery of said bottom section upon which its hinge is connected.

4. In a device of the kind described, a bottom section, a top section, a plurality of collapsible uprights between said bottom section and top-section adapted to permanently interconnect the same, side sections, each side section having a hinge connected with the bottom section, and one of said side sections having journal portions spaced away from the periphery of said bottom section upon which its hinge is connected.

5. In a device of the kind described, a bottom section, a top section, a plurality of articulated collapsible uprights between said bottom section and top section adapted to permanently interconnect the same; each upright comprising a lower member pivoted to said bottom section, an upper member pivoted to said top section, an articulation or joint interconnecting said lower member with said upper member, releasable means for retaining said articulation or joint against operation; side sections, each side section having a hinge connected with the bottom section, and one of said side sections having journal portions spaced away from the periphery of said bottom section upon which its hinge is connected.

6. In a device of the kind described, a bottom section, a top section, a plurality of articulated collapsible uprights between said bottom section and top section adapted to permanently interconnect the same; each upright comprising a lower member pivoted to said bottom section, stop means for limiting the upward and outward swinging movement of said lower member, an upper member pivoted to said top section, an articulation or joint interconnecting said lower member with said upper member, releasable means for retaining said articulation or joint against operation; and side sections, each side section being connected pivotally to said bottom section.

7. In a device of the kind described, a bottom section, a top section, a plurality of articulated collapsible uprights between said bottom section and top section adapted to permanently interconnect the same; each upright comprising a lower member pivoted to said bottom section, stop means for limiting the upward and outward swinging movement of said lower member, an upper member pivoted to said top section, an articulation or joint interconnecting said lower member with said upper member, said lower member having an extension beyond its jointure with said upper member, said extension being adapted to aline itself parallel to said upper member when said uprights are erected in normal supporting position, a tubular coupling member slidable on said upper member and adapted to be moved over said extension to rigidly bind the same to said upper member and thus prevent the operation of said articulation or joint; and side sections, each side section being connected pivotally to said bottom section.

In testimony that I claim the invention set forth above I have hereunto set my hand this 29th day of September, 1915.

WILLIAM F. OTTMANN.

Witnesses:
C. W. LAW,
THOS. J. FARRELL.

Copies of this patent may be obtained for five cents each, by addressing the "Commissioner of Patents, Washington, D. C."